(12) United States Patent
Zhu et al.

(10) Patent No.: US 12,344,176 B2
(45) Date of Patent: Jul. 1, 2025

(54) BATTERY MANAGEMENT FOR C-V2X (CELLULAR VEHICLE-TO-EVERYTHING)

(71) Applicant: Continental Automotive Systems, Inc., Auburn Hills, MI (US)

(72) Inventors: Yu Zhu, Vernon Hills, IL (US); Tom Oberhauser, Algonquin, IL (US); Janakiram Sistla, Schaumburg, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 98 days.

(21) Appl. No.: 18/476,274

(22) Filed: Sep. 27, 2023

(65) Prior Publication Data

US 2025/0100488 A1 Mar. 27, 2025

(51) Int. Cl.
| | |
|---|---|
| *G06F 1/32* | (2019.01) |
| *B60R 16/033* | (2006.01) |
| *G01S 19/34* | (2010.01) |
| *H04W 4/029* | (2018.01) |
| *H04W 4/40* | (2018.01) |
| *B60R 25/40* | (2013.01) |

(52) U.S. Cl.
CPC ............ *B60R 16/033* (2013.01); *G01S 19/34* (2013.01); *H04W 4/029* (2018.02); *H04W 4/40* (2018.02); *B60R 25/403* (2013.01)

(58) Field of Classification Search
CPC ..... B60R 16/033; B60R 25/403; G01S 19/34; H04W 4/029; H04W 4/40
See application file for complete search history.

(56) References Cited

U.S. PATENT DOCUMENTS

| | | | |
|---|---|---|---|
| 9,798,307 B2 | 10/2017 | Zhang et al. | |
| 10,306,559 B2* | 5/2019 | Kench | G01S 19/34 |
| 10,383,059 B2* | 8/2019 | Lei | H04W 52/0241 |
| 10,571,990 B2 | 2/2020 | Kim | |
| 2011/0022254 A1 | 1/2011 | Johas Teener et al. | |
| 2014/0370909 A1 | 12/2014 | Natucci, Jr. et al. | |
| 2015/0334536 A1 | 11/2015 | Suzuki | |
| 2015/0355703 A1 | 12/2015 | Macdonald et al. | |
| 2020/0196235 A1 | 6/2020 | Synnergren | |
| 2021/0211990 A1 | 7/2021 | Plechinger | |

FOREIGN PATENT DOCUMENTS

WO 2022037384 A1 2/2022

OTHER PUBLICATIONS

The International Search Report and the Written Opinion of the International Searching Authority mailed on Jan. 7, 2025 for the counterpart PCT Application No. PCT/US2024/047879.

* cited by examiner

*Primary Examiner* — An T Nguyen (57) ABSTRACT

When a parked automotive vehicle is located at a hazard location, both a Cellular Vehicle-to-Everything (C-V2X) modem of the parked automotive vehicle and a Global Navigation Satellite System (GNSS) engine of the parked automotive vehicle are left on to increase safety, relative to turning the C-V2X modem off, by having the C-V2X modem continue to send C-V2X messages. When the parked automotive vehicle is not located at a hazard location and is located at a known long-parking location, turning off both the GNSS engine and the C-V2X modem to reduce battery-power consumption relative to leaving both the GNSS engine and the C-V2X modem on.

18 Claims, 6 Drawing Sheets

BATTERY MANAGEMENT FOR C-V2X (CELLULAR VEHICLE-TO-EVERYTHING)

BACKGROUND

Embodiments of the invention relate generally to battery management for C-V2X (Cellular Vehicle-to-Everything).

V2X (Vehicular-to-Everything) communication enables safe, dependable, and efficient transportation services. C-V2X is an upcoming prominent technology developed within 3GPP (the 3rd Generation Partnership Project) and designed to operate in vehicle-to-vehicle and vehicle-to-network modes. V2X communication generates real-time and highly reliable information about the underlying vehicle for implementing safe, efficient, and environmentally conscious transportation services and laying the groundwork for connected and automated driving. C-V2X has vast potential to enhance vehicular-traffic management worldwide. It can help ease problems like traffic congestion, increased fuel consumption, road safety, and minimized road capacity. It presents the substructure for vehicles to communicate with each other and things around them, providing all-around non-line-of-sight awareness and a higher level of predictability for better road safety and autonomous driving.

C-V2X is a 3GPP standard for V2X applications such as self-driving cars. It is an alternative to 802.11p (i.e., DSRC), the IEEE specified standard for V2V and other forms of V2X communications.

C-V2X is designed to operate in two modes: (1) Device-to-network: communication using conventional cellular links for V2N (Vehicle-to-Network) applications such as cloud services in end-to-end solutions; and (2) Device-to-device: direct communication without the use of network scheduling for V2V (vehicle-to-vehicle), V2I (vehicle-to-infrastructure), and V2P (Vehicle-to-Pedestrian) applications, including, but not limited to: vulnerable road user protection; and tolling.

In device-to-network mode, C-V2X may use 3GPP standardized 4G LTE, 5G, or any other suitable protocol in mobile cellular connectivity to exchange messages between vehicles, pedestrians, and wayside traffic control devices such as traffic signals. It commonly uses the 5.9 GHZ frequency band, which is the officially designated intelligent transportation system (ITS) frequency in most countries. C-V2X can function without network assistance and exceeds the range of DSRC by anywhere from about 25% to more than 100%.

C-V2X was developed within the 3rd Generation Partnership Project (3GPP) to replace DSRC in the US and C-ITS in Europe.

C-V2X sidelink transmission mode 4 communication relies on a distributed resource allocation scheme, namely sensing-based semipersistent scheduling, which schedules radio resources in a stand-alone fashion in each user equipment. It is also the base for direct PC5 airlink interface used by V2V/V2I/V2P to communicate with nearby vehicles, infrastructure (C-V2X roadside units) and pedestrians.

V2V/V2I/V2P on a vehicle broadcasts its basic safety message (BSM) to nearby vehicles, roadside units, and pedestrians that are equipped with C-V2X. The BSM message includes identifier, timestamp, location in latitude and longitude, heading, speed, and other safety information of the vehicle. In addition, through TIM (Traveler information message) and CAM (Cooperative Awareness Message) messages of V2I, the vehicle can receive traffic conditions on road incidents, road constructions, weather warning, intersections, etc.

A Dual Subscriber Identity Module (SIM) Dual Active (DSDA) User Equipment (UE) can use two SIMs and two radios, to maintain two active calls simultaneously. For example, a DSDA UE can receive a second call while conducting a first and switching between the two calls without dropping either.

RAT (Radio Access Technology) refers to the various connection technologies used in a mobile network, including, but not limited to 3G, 4G LTE, C-V2X, 5G, and the like. Power consumption by a cellular modem often increases as RAT evolves from one standard to a subsequent standard.

In the context of automotive Telematics, a cellular modem is involved in connected-car applications. When the vehicle ignition is turned off, the modem typically remains on in order to receive over the air telematics commands, e.g. remote-door unlock, and the like, while other application processors (often high-performance CPUs) go into power-collapse mode to save vehicle battery.

With the addition of C-V2X RAT to a Telematics Control Unit (TCU), power consumption from the cellular modem will further increase, and because C-V2X operation typically also requires application processors and a GNSS (Global Navigation Satellite System) engine to stay on to process related real-time high throughput data, improvements to such a battery-management scheme would advance the state of the art.

When the vehicle's ignition is turned off, if C-V2X remains on, GNSS will continue operating to provide location information used by C-V2X, along with a C-V2X application running on the application processor, The power consumption could be 100 times or more compared to the same TCU under the same conditions, but without a C-V2X modem and a GNSS engine operating. For example:

| Type of configuration | Power consumption budget - mW (at 12 Volts) |
| --- | --- |
| TCU application processor suspended, LTE standby, C-V2X off, GNSS off | 36 |
| TCU application processor on, LTE standby, C-V2X on, GNSS on | 4500 |

For example, an average car battery has a full capacity of around 480-1200 watt hours. If a vehicle is not operated for an extended period, for example, 2 weeks, leaving C-V2X on continuously while the ignition is off, the vehicle battery power would be significantly impacted (e.g, not enough charge to start the car upon return).

BRIEF SUMMARY

In accordance with embodiments of the invention, when a parked automotive vehicle is located at a hazard location, both a Cellular Vehicle-to-Everything (C-V2X) modem of the parked automotive vehicle and a Global Navigation Satellite System (GNSS) engine of the parked automotive vehicle are left on to increase safety, relative to turning the C-V2X modem off, by having the C-V2X modem continue to send C-V2X messages. When the parked automotive vehicle is not located at a hazard location and is located at a known long-parking location, turning off both the GNSS engine and the C-V2X modem to reduce battery-power consumption relative to leaving both the GNSS engine and the C-V2X modem on.

DETAILED DESCRIPTION

Embodiments of the invention use a determination of the hazard level of a location of a vehicle when the vehicle's ignition is turned off to determine whether to leave C-V2X and GNSS circuits and associated software elements of the TCU on while the vehicle's ignition remains off.

The purpose of C-V2X is to communicate a vehicle's identifier, timestamp, location, heading and speed, and other basic safety information to surrounding vehicles, especially when out of line-of-sight to improve road safety. According to a typical design, when the vehicle's ignition is off, the vehicle's C-V2X (and GNSS) is also turned off.

But when a vehicle's ignition is off, it is possible that having C-V2X remain on would be preferable to turning C-V2X off. For example, the vehicle might be experiencing some type of trouble on the road, such as a mechanical problem that is preventing the vehicle from proceeding normally along its intended route. Simply turning C-V2X off, without checking actual road conditions could be potentially dangerous. When a vehicle is disabled in traffic, it is preferable for C-V2X to stay on to automatically announce to surrounding vehicles that it is disabled. In contrast, when the vehicle is parked at home or in a parking lot or airport garage, leaving C-V2X on has very limited value. In addition, operating C-V2X and GNSS involves the C-V2X application processor staying on which together could consume more than 100 times the current as compared to suspending the application processor and leaving the C-V2X modem and GNSS engine off.

One concern regarding turning off C-V2X and GNSS is that it takes time for C-V2X to transition from off to an operational mode since it obtains its timing and location information from GNSS, and GNSS cold start could take up to 60 seconds, if the GNSS signal is weak. And because C-V2X is a mission-critical feature, the feature should be activated quickly when needed. One way to address this concern is by asking a vehicle's driver how long the car is expected to be parked at the location to determine whether to completely turn off C-V2X and GNSS, or to put the feature in standby mode. For example, if an expected parking duration in a safe location is less than 20 minutes, C-V2X and GNSS may be configured to remain in standby mode for 20 minutes and may then be turned off once more than 20 minutes has gone by. Such trips might include a trip to a nearby grocery store to pick up some milk, a trip to the post office to ship a package, drop off a gift at a friend's house, or stop and go fast food deliveries etc. On the other hand, if the car is expected to be parked at home for more than 4 hours, C-V2X and GNSS can be turned off upon ignition off. This intelligence about how to handle C-V2X and GNSS in ignition-off mode may also be configured on a telematics server, based on past addresses, and averaged parking durations from a user's navigation system, and then the profile may be downloaded to the vehicle.

Vehicle battery is a finite resource. When the vehicle is parked at a safe location, having C-V2X and GNSS drain the vehicle battery is unnecessary. Under such conditions, turning off C-V2X and GNSS reduces battery-power consumption.

The intent of V2V and V2P of C-V2X is to help vehicles and pedestrians equipped with the feature to be aware of the location, speed, and direction of travel of surrounding vehicles to improve road safety. C-V2X may, therefore, be turned off when the vehicle is at a safe location for doing so. A vehicle's TCU can check the vehicle's location via an online (or offline) map service. The vehicle's location may be used to make better decisions regarding keeping the vehicle's C-V2X system turned on, which, in turn, results in improved driving safety. Improvement in managing C-V2X and GNSS when a vehicle's ignition is turned off, results in improved power management of the TCU.

Figure 1:
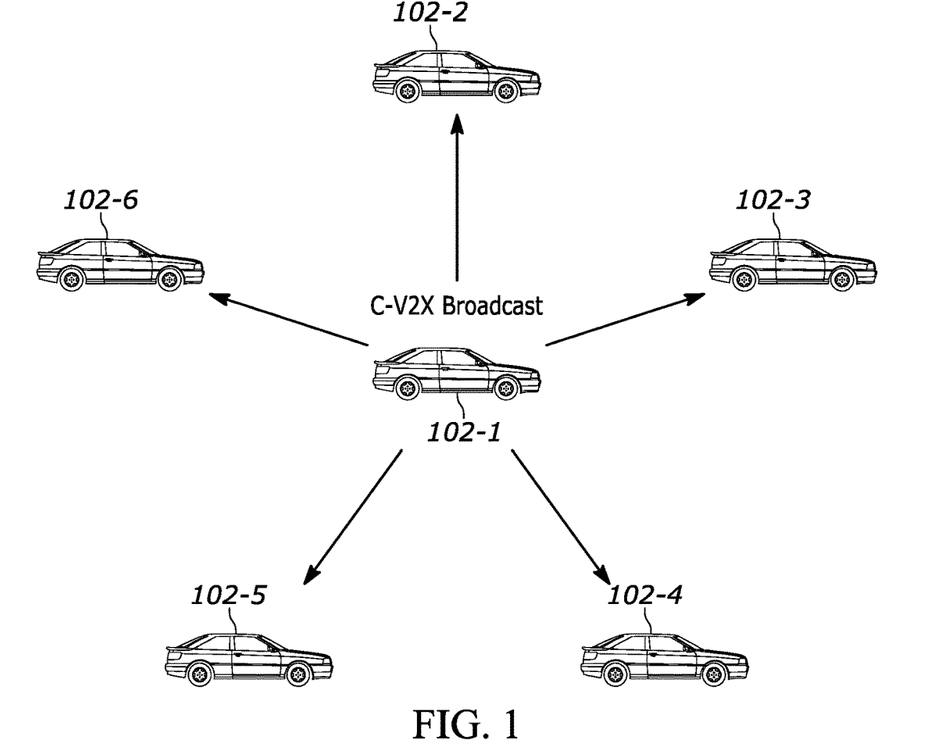
FIG. 1 depicts an example operating environment for embodiments of the invention.

FIG. 1 depicts an example operating environment for embodiments of the invention. As shown in FIG. 1, a first vehicle, 102-1, transmits broadcast messages to a plurality of other vehicles 102-2 through 102-6 via C-V2X. As mentioned earlier, C-V2X may operate in both device-to-network mode and device-to-device mode, namely, vehicle-to-vehicle, without connecting to a cellular network via a cell-phone tower.

Figure 2:
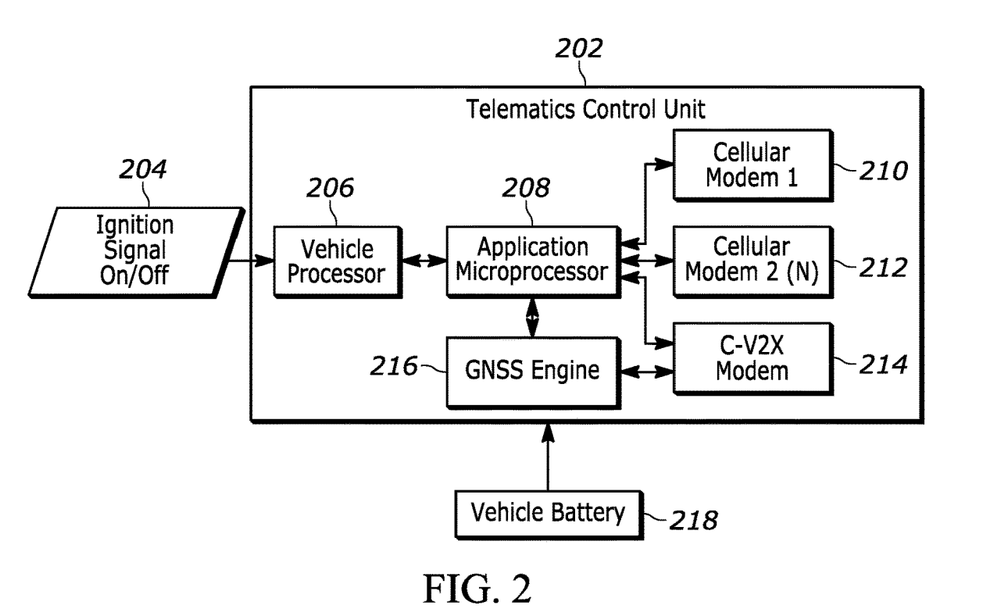
FIG. 2 depicts a schematic block diagram of a system in accordance with embodiments of the invention.

FIG. 2 depicts a schematic block diagram of a system in accordance with embodiments of the invention. A TCU (Telematics Control Unit) 202 includes a vehicle processor 206, an application microprocessor 208 where C-V2X and other Telematics applications execute, a first cellular modem (used for Telematics services) 210, a second cellular modem 212 (used for other infotainment services on a personal SIM, and it is possible to extend the architecture to support more than 2 cellular radios up to N modems), a C-V2X (Cellular Vehicle-to-Everything) modem 214 (sometimes combined with the first cellular modem), and a GNSS (Global Navigation Satellite System) engine 216 that provides the location of the vehicle.

The vehicle processor of the TCU receives an ignition on/off signal 204 typically via the vehicle's CAN (Controller Area Network) bus. The TCU receives power from the vehicle battery 218.

For telematics, without C-V2X, upon receiving an ignition-on signal, the application processor would be powered on, the cellular modem would be powered on, and the GNSS would be powered on. Upon receiving an ignition-off signal, the application processor and GNSS engine would be suspended (i.e., put into a power-saving mode to save significant power consumption), and the cellular modem would remain powered on to receive incoming telematics service messages (e.g., door unlock).

For telematics, with C-V2X, upon receiving an ignition on-signal, the application processor 208 is powered on, the cellular modem 210 used by Telematics services is powered on, the C-V2X modem 214 is powered on, and the GNSS engine 216 is powered on. The other cellular modems are powered on.

Some newer TCUs have DSDA (Dual Standby Dual Active), which is basically 2 RF-transceiver modems in one. One modem is used by Telematics services, and the other modem is used by the vehicle user's SIM.

For such a system, when vehicle ignition is turned off, the modem for telematics services may stay on, and the RF-transceiver modem for the vehicle user's SIM may be turned off to reduce current drain.

When the vehicle is determined to be in a safe location and the C-V2X modem is to be put into a standby mode, upon receiving an ignition-off signal, the application processor 208 is suspended, the cellular modem 210, used for Telematics services, remains powered on, the other cellular modems are powered off, the C-V2X modem 214 remains powered on, the GNSS engine is powered off, which results in broadcasting the last known location determined by the GNSS engine 216.

When the vehicle is determined to be in a safe location and the C-V2X modem 214 is to be put into an off mode, upon receiving an ignition-off signal, the application processor 208 is suspended, the cellular modem used by Telematics services, remains powered on, the other cellular modems are powered off, the C-V2X modem 214 is powered off, and the GNSS engine 216 is powered off.

Figure 3:
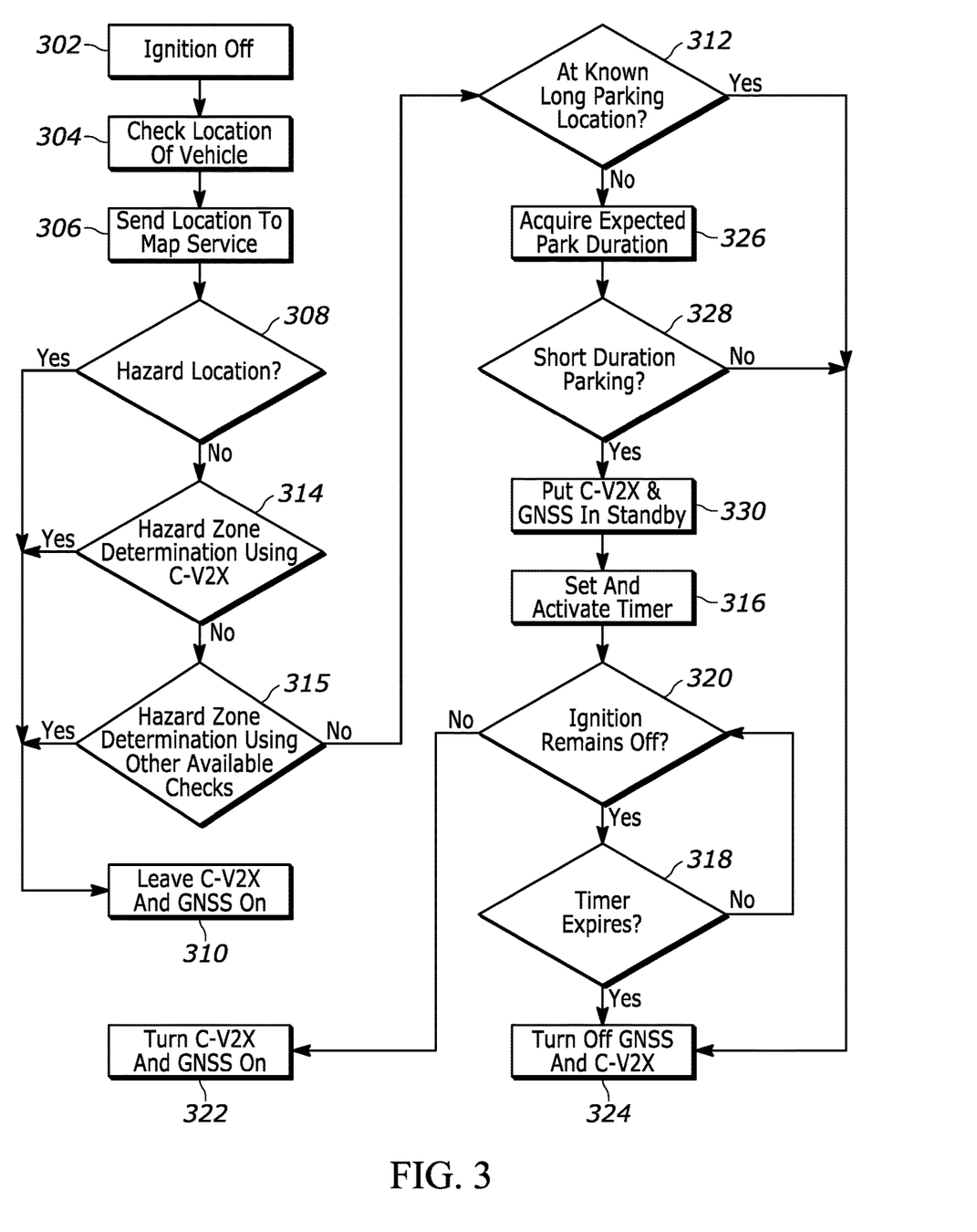
FIG. 3 is a flow chart that depicts a process in accordance with embodiments of the invention.

When the vehicle is determined to be in a hazardous location, upon receiving an ignition-off signal, the application processor 208 remains powered on, the cellular modem used by Telematics services remains powered on, the other cellular modems are powered off, the C-V2X modem 214 remains powered on, and the GNSS engine 216 remains powered on. FIG. 3 is a flow chart that depicts a process in accordance with embodiments of the invention. Vehicle ignition being turned off is depicted at 302. The vehicle's location is determined at 304. The GNSS engine provides the location of the TCU in longitude and latitude coordinates periodically to the C-V2X application being executed by the application processor. The vehicle's location is then sent to a map service (either online using the Telematics connection or the V2N link or offline). For example, with online OSRM (nearest) webservice, make a GET request to '//router.project-osrm.org/nearest/v1/driving/' with longitude and latitude coordinates, the response will indicate whether the location is on a road or not. If the location is on a road, the location is considered as a hazard location. The Open-Source Routing Machine or OSRM is a C++ implementation of a high-performance routing engine for shortest paths in a road network. OSRM "nearest" finds a nearest road segment by computing the point-segment distance to the provided input coordinates.

A determination is made with respect to whether the vehicle is located at a hazardous location, as shown at 308. Determining whether the vehicle is at a hazardous location in this context may be determined based on whether the vehicle's hazard lights are on and/or based on the nature of the location of the vehicle, including, but not limited to, whether the vehicle is parked at home, in a parking garage or parking lot, or whether the vehicle is located on, or near, a road with other vehicles traveling on the road. Hazard warnings received over the map service or C-V2X direct warning from infrastructure (e.g., TIM (Traveler Information Message), CAM (Cooperative Awareness Message) messages, and the like, which are defined in SAE J2735 and ETSI CAM/DENM standards) can also be used to determine whether the location is a hazard location. Some of the examples include, but are not limited to, Accident Zone, Traffic Jam Ahead, Weather Condition Warning, Slippery Road, Pedestrian Ahead, Railway Crossing, Lane Closure, Road Closure, Road Works, and the like.

A timestamp, location, heading, and speed of remote vehicle, which are received over C-V2X, may be used to determine whether that vehicle is a safety hazard for the local vehicle (i.e., the vehicle that received the information via C-V2X) at that time. For example, a hazard location determination algorithm may be implemented as follows:

For any remote vehicle traveling at 7 mph or higher and if its heading (based on remote vehicle BSM received by local vehicle via C-V2X) is within ±10% (or any other suitable number chosen by system design) range of θ calculated below $$\theta = \text{atan } 2(\sin \Delta\lambda \times \cos \varphi_2, \cos \varphi_1 \times \sin \varphi_2 - \sin \varphi_1 \times \cos \varphi_2 \times \cos \Delta\lambda)$$

θ is the straight direction from remote vehicle to local vehicle.

φ1, λ1 is the latitude and longitude for the remote vehicle, φ2, λ2 is the latitude and longitude for the local vehicle. ΔΔ is the difference in longitude, $$\Delta\lambda = \lambda 2 - \lambda 1$$

The distance between the two vehicles may be estimated as $$a = \sin^2(\Delta\varphi/2) + \cos \varphi 1 \times \cos \varphi 2 \times \sin^2(\Delta\lambda/2)$$

$$d = R \times 2 \times \text{atan2}(\sqrt{a}, \sqrt{(1-a)})$$

Where Δφ=φ2−φ1 (latitude delta between the 2 vehicles), R is the Earth's radius.

With speed information of the remote vehicle, it can be determined how soon the remote vehicle will come near to the local vehicle.

$$T = d/\text{speed of remote vehicle}$$

For example, if the calculated value of T is smaller or equal to 40 seconds or any suitable duration by design when speed is higher than 7 miles/hour, the location of the local vehicle may be considered hazardous, also referred to herein as a hazard location. After ignition off, once scanning of surrounding vehicles within a preset time period (e.g., 3 minutes) is completed, and if any remote vehicle scanned fits the criteria set forth above, then the location may be determined as a hazardous location. The criteria mentioned above for determining whether a location is hazardous are exemplary and not intended to be limiting. For example, such a determination may be made for any remote vehicle traveling at 5 mph or higher or 3 mph or higher, and the like. Similarly, T may be less than or equal to 60, 80, or 120 seconds.

When the vehicle is determined to be in a hazardous location via a map service, the yes branch is followed from 308, and the C-V2X application, C-V2X modem, and GNSS engine remain on, but C-V2X can optionally be set in Transmit-only mode to reduce power consumption, as shown at 310.

When the local vehicle is determined not to be in a hazardous location via a map service, or the map service fails to determine whether the vehicle is in a hazard location, the hazard-zone-determination algorithm using C-V2X, as described in more detail above is executed, as depicted at 314.

When the local vehicle is determined to be in a hazardous location via the hazard-zone-determination algorithm, the yes branch is followed from 314, and the C-V2X application, C-V2X modem, and GNSS engine remain on, but C-V2X can optionally be set in Transmit-only mode to reduce power consumption, as shown at 310.

When the vehicle is determined not to be in a hazardous location, the no branch from 314 is followed, and a determination is made with respect to whether other available hazard-determination checks (e.g., using Lidar, one or more on-board vehicle cameras, Radar technologies, and the like) indicate that the local vehicle's current location is a hazard location. If so, the yes branch is followed from 315, and the C-V2X application, C-V2X modem, and GNSS engine remain on, but C-V2X can optionally be set in Transmit-only mode to reduce power consumption, as shown at 310.

Otherwise, the no branch from 315 is followed and a determination is made as to whether the vehicle is located at a known long-duration parking location, as shown at 312. Such a known parking location may include: at home, at work, in a parking garage, and the like e.g all known addresses from travel history of an on-board navigation system of the local vehicle. With the average parking duration of known addresses, an address can be marked as long (>4 hours) parking address or short (<20 minutes) parking address. These are example values, as are the values in the following table, and other suitable values could also be used, such as, for the long-parking duration, greater than 2 hours or 1 hour or 30 minutes, and, for the short-parking duration, less than 30 minutes, 1 hour, 2 hours, or 3 hours.

| Address 1 | Average Park duration | Home | Long (>4 hours) |
| Address 2 | Average Park duration | Work | Long (>4 hours) |
| ... | | | |
| Address n | Average Park duration | Post office | Short (<20 minutes) |

When the local vehicle is determined to be located other than at a known long-parking location, the no branch from 312 is followed, and expected parking duration is acquired via user input or may be determined based on a historical average parking duration if the address is known 326. For example, a mean, median, mode, or range, may be determined based on a set of historical parking durations at the current location of the local vehicle. In accordance with embodiments of the invention, the expected parking duration may be set manually by asking the driver of the vehicle through a vehicle user interface, such as via a touch screen display, by audio prompt and speech recognition, or the like.

In accordance with embodiments of the invention, when a user inputs an expected parking duration, the user may be provided with an option to mark the current parking location as a hazard location thereby overriding a determination by the system that the parking location is not a hazard location.

When the vehicle is determined to be located at a known long-parking location, the yes branch from 312 is followed, the GNSS engine is turned off, the C-V2X modem is turned off with application processor powered off or suspended, as shown at 324.

When the expected parking duration is determined to be long duration (e.g., 4 hours or more), the no branch from 328 is followed, the GNSS engine is turned off, the C-V2X modem is turned off with application processor powered off or suspended, as shown at 324.

When the expected parking duration is determined to be short duration (e.g., 30 minutes or less), the yes branch from 328 is followed. Before a timer is set according to the expected parking duration 316, the C-V2X modem and the GNSS engine may be put in standby mode, which is a power-saving mode during which the C-V2X modem and GNSS engine are ready to wake up more quickly than from a fully off state 330.

A determination is then made with respect to whether ignition remains off, as shown at 320.

A determination is then made with respect to whether the timer has expired, as shown at 318.

When it is determined that the timer has not yet expired, the no branch from 318 is followed, and another determination is then made with respect to whether ignition remains off as shown at 320 followed by another determination with respect to whether the timer has expired, as shown at 318.

When it is determined that ignition remains off, the yes branch from 320 is followed, and a determination is made with respect to whether the timer has expired, as shown at 318.

When it is determined that the vehicle ignition has not remained off, the no branch from 320 is followed, and the C-V2X application, C-V2X modem, and the GNSS engine are turned on, as shown at 322.

Figure 4:
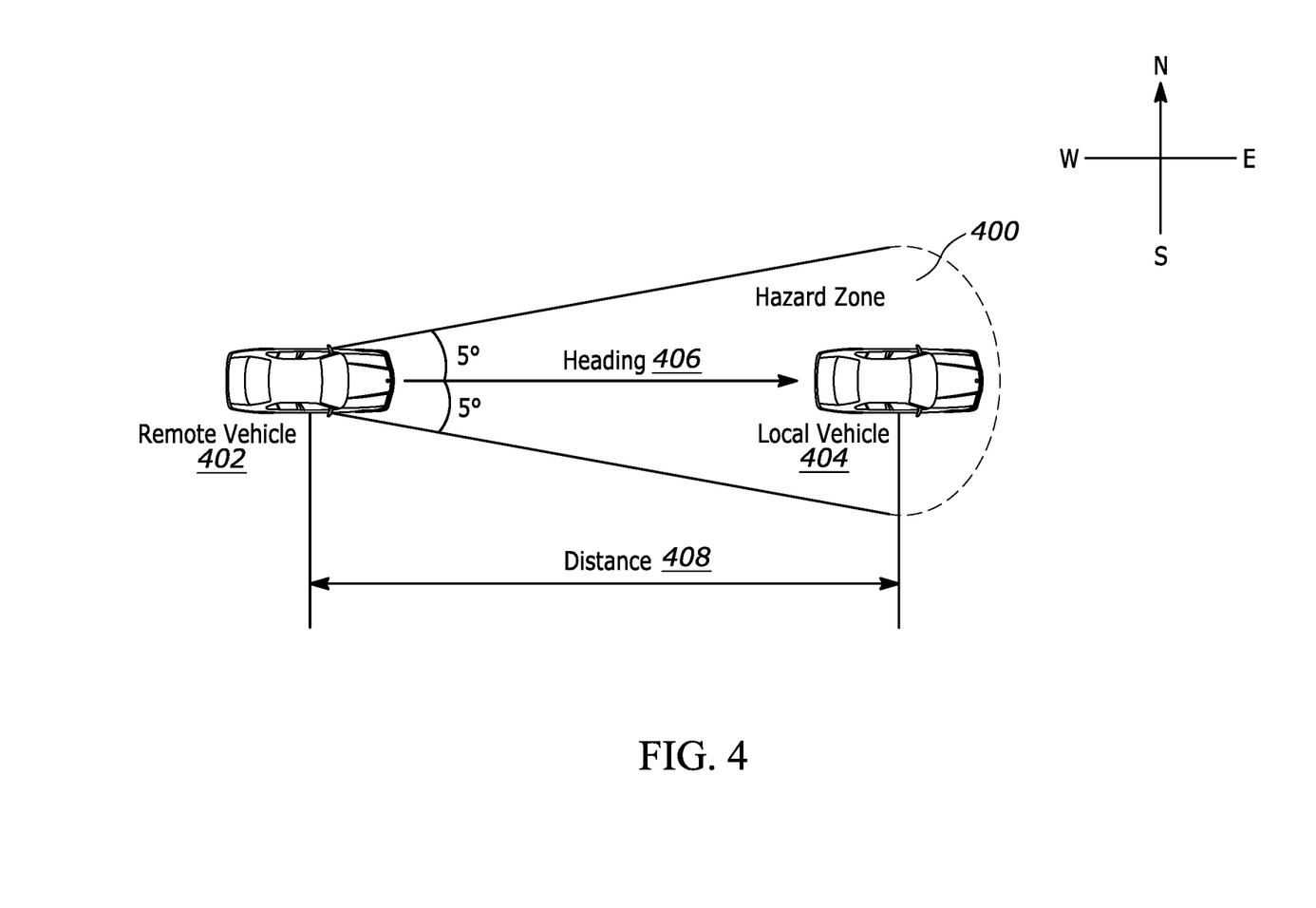
FIG. 4 is a top view of a local vehicle, a remote vehicle, and a hazard zone in accordance with embodiments of the invention.

When it is determined that the vehicle ignition has remained off, the yes branch from 320 is followed, and when it is determined that timer expires, the yes branch from 318 is followed and the GNSS engine is turned off, the C-V2X modem is turned off, with the application processor powered off or suspended, as shown at 324. FIG. 4 is a top view of a local vehicle, a remote vehicle, and a hazard zone in accordance with embodiments of the invention. The remote vehicle 402 is headed toward the local vehicle 404, as indicated by heading arrow 406. A generally cone-shaped hazard zone 400 is depicted with side boundaries diverging at angles of 5 degrees from the heading 406 of the remote vehicle 402. A distance 408 between the remote vehicle and the local vehicle is shown. A mentioned above, the time it would take the remote vehicle to reach the local vehicle may be calculated by the familiar relationship, which may be expressed as the distance 408 divided by the speed of the remote vehicle, when the speed of the remote vehicle exceeds a predetermined speed, such as 5, 10, 15, 20, or 25 miles per hour, and when the local vehicle is not moving.

Figure 5:
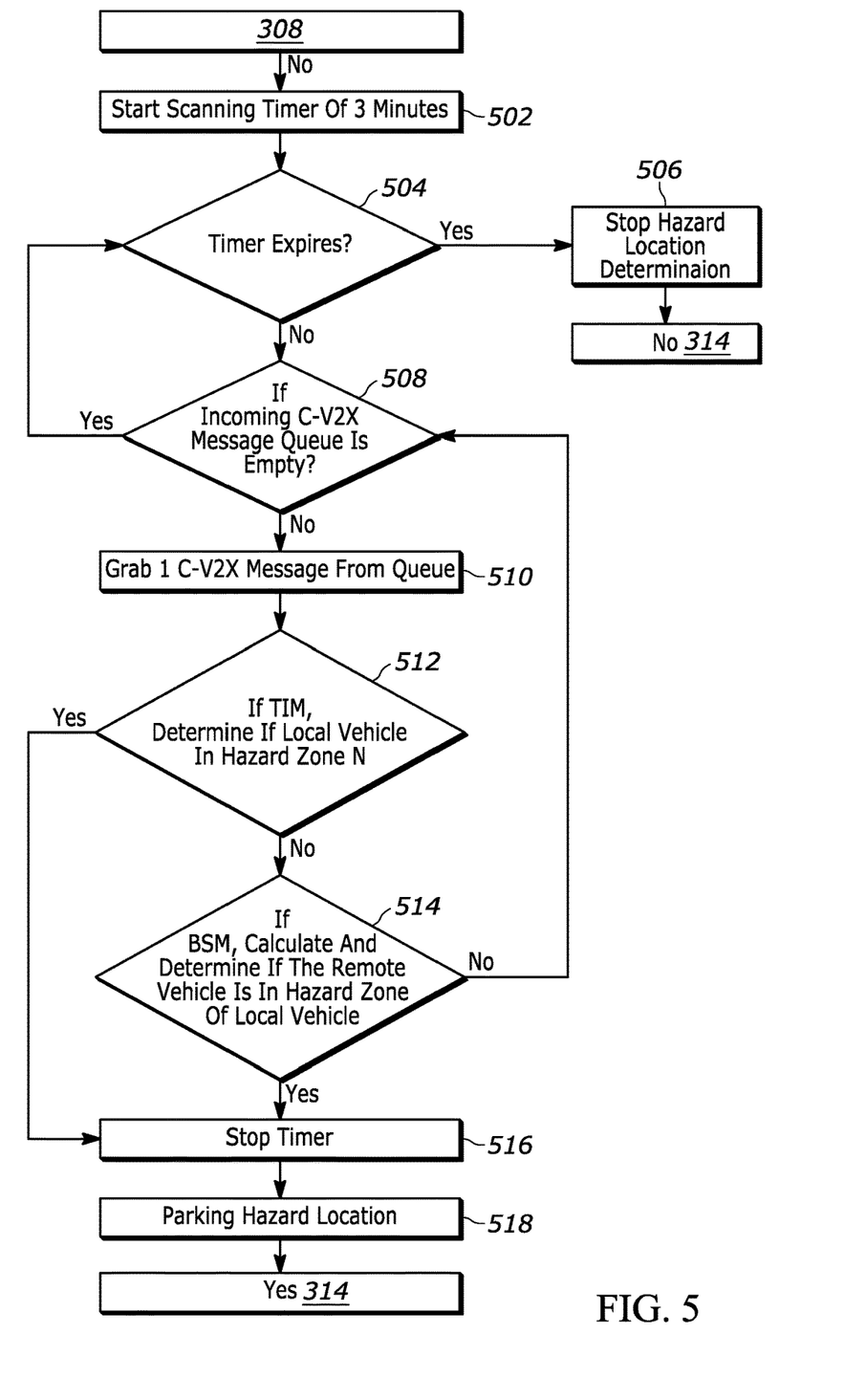
FIG. 5 depicts steps for determining a hazard location in accordance with embodiments of the invention.

FIG. 5 depicts steps for determining a hazard location in accordance with embodiments of the invention. A C-V2X-scanning timer is started with a predetermined duration, such as, for example, a value of at least 1, 2, 3, 4, or 5 minutes.

A determination is made with respect to whether the C-V2X-scanning timer has expired, as shown at 504. When the timer has expired, the hazard-location determination process is terminated, as shown at 506, and the no branch from 314 is followed.

While the C-V2X-scanning timer has not yet expired, the no branch from 508 is followed, and a determination is made with respect to whether an incoming C-V2X message queue is empty. When the C-V2X message queue is determined to be empty, the yes branch from 508 is followed, and processing returns to 504. When the C-V2X message queue is determined to be not empty, the no branch from 508 is followed, and a C-V2X message is retrieved from the queue, as shown at 510.

A determination is then made with respect to whether, based on a TIM message, the local vehicle is in a hazard zone. A TIM (Traveler Information Message) may be used to contain a variety of traffic condition and "advanced traveler" messages. It provides the means to inform the public about both incidents (traffic accidents) and pre-planned roadwork events. The TIM message can be used to alert the public to severe weather conditions and other local or regional emergencies. It can also be used for a variety of speed warnings, traffic signage, road conditions, and other general information.

When it is determined, based on a TIM message, that the local vehicle is in a hazard zone, the yes branch from 512 is followed, the C-V2X-scanning timer is stopped, as shown at 516, and the parking location of the local vehicle is determined to be a hazard location, as depicted at 518, and processing then follows the yes branch from 314 in FIG. 3.

When it is determined, based on a TIM message, that the local vehicle is not in a hazard zone, the no branch from 512 is followed, and a determination is made with respect to whether, based on a BSM message and calculations based on the speed, heading, and distance of the remote vehicle 402 relative to the local vehicle 404, the remote vehicle is in a hazard zone of the local vehicle.

When it is determined that the remote vehicle is in a hazard zone of the local vehicle, the yes branch from 514 is followed, the C-V2X-scanning timer is stopped, as shown at 516, and the parking location of the local vehicle is determined to be a hazard location, as depicted at 518, and processing then follows the yes branch from 314 in FIG. 3.

When it is determined that the remote vehicle is not in a hazard zone of the local vehicle, the no branch from 514 is followed, and a determination is made with respect to whether the C-V2X-scanning timer has expired, as depicted at 508, which is discussed in more detail above.

Figure 6:
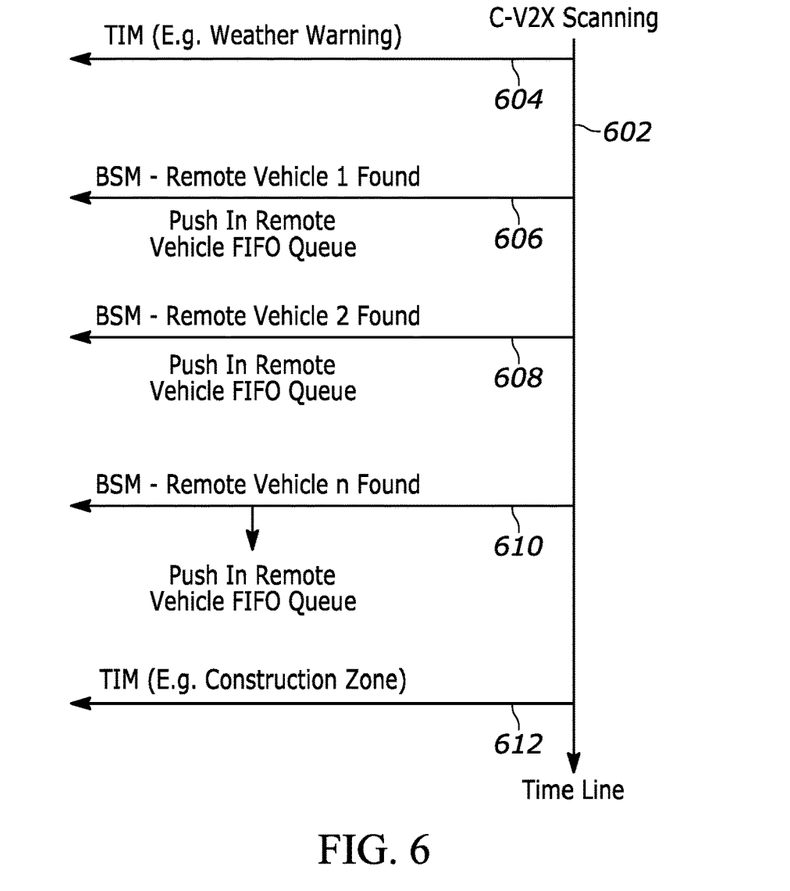
FIG. 6 depicts C-V2X arriving at a TCU (Telematics Control Unit) in accordance with embodiments of the invention.

FIG. 6 depicts C-V2X arriving at a TCU (Telematics Control Unit) in accordance with embodiments of the invention. A timeline 602 proceeds with earlier C-V2X messages shown above and later C-V2X messages shown below. TIM (e.g., weather warning) 604 and TIM (e.g., construction zone) 612 are depicted along with BSMs 606, 608, and 610, corresponding to remote vehicles 1, 2, and n, where n may be any integer greater than 2, that are pushed into a remote vehicle FIFO (First In First Out) queue.

Figure 7:
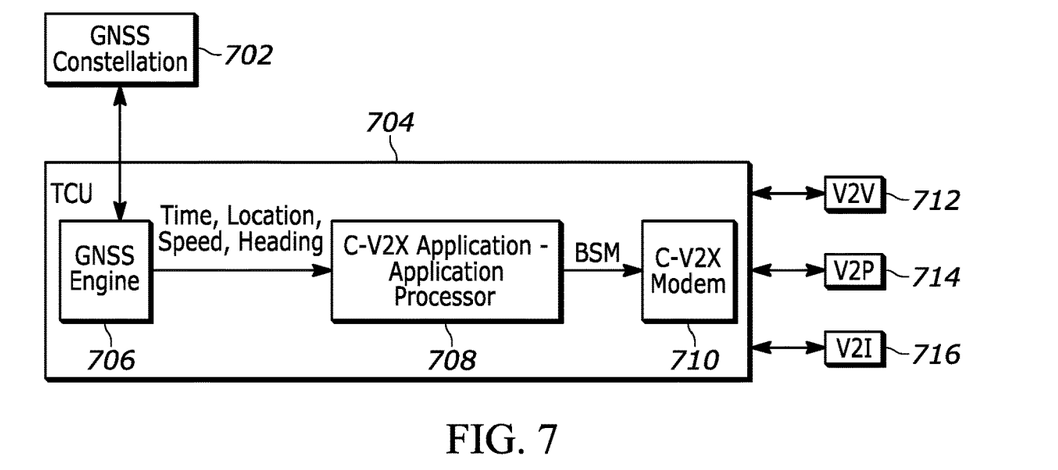
FIG. 7 shows how BSM messages are formed and sent out by a telematics control unit 704 through C-V2X, in accordance with embodiments of the invention.

FIG. 7 shows how BSM messages are formed and sent out by a telematics control unit 704 through C-V2X, in accordance with embodiments of the invention. GNSS (Global Navigation Satellite System) data is received by the GNSS engine 706 from the GNSS constellation 702. The GNSS engine forwards time, location speed, and heading information to a C-V2X application 708, which is being executed by an application processor. A BSM (Basic Safety Message) is received by the C-V2X modem 710, which may transmit C-V2X data via one or more of V2V 712, V2P 714, and V2I 716. In this way, any vehicle with C-V2X capability may broadcast its time, location, speed, and heading, regardless of whether the vehicle is a local vehicle or a remote vehicle. When a local vehicle is stationery, its location, speed, and heading don't change. It, therefore, doesn't have to rely on GNSS to form the BSM message.

Figure 8:
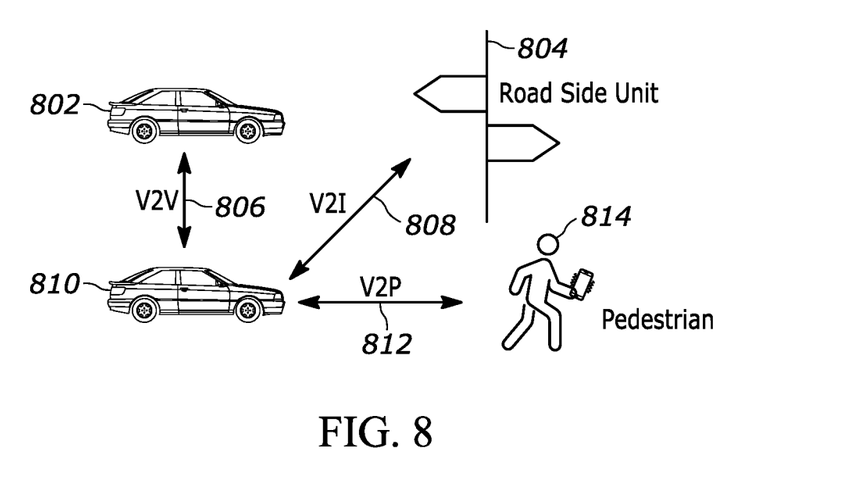
FIG. 8 depicts PC5 V2V, V2I, and V2P links in accordance with embodiments of the invention.

FIG. 8 depicts PC5 V2V, V2I, and V2P links in accordance with embodiments of the invention. PC5 V2V link 806 is shown between vehicles 802 and 810. PC5 V2I link 808 is shown between road side unit 804 and vehicle 810. PC5 V2P link 812 is shown between pedestrian 814 and vehicle 810. A PC5 link is a C-V2X direct-communication interface that is similar to DSRC and enables direct communication, without using a cellular network, between the local vehicle and other vehicles, road-side units, and pedestrians.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method performed by a telematics control unit of a parked automotive vehicle, the method comprising:
   determining whether an ignition of the parked automotive vehicle is off;
   determining whether the parked automotive vehicle is located at a hazard location;
   when the parked automotive vehicle is determined to be located at a hazard location, leaving both a Cellular Vehicle-to-Everything (C-V2X) modem of the parked automotive vehicle and a Global Navigation Satellite System (GNSS) engine of the parked automotive vehicle on to increase safety, relative to turning the C-V2X modem off, by having the C-V2X modem continue to send C-V2X messages;
   when the parked automotive vehicle is determined to be located at a location that is not a hazard location, determining whether the parked automotive vehicle is located at a known long-parking location; and
   when the vehicle is determined to be located at a known long-parking location, turning off both the GNSS engine and the C-V2X modem to reduce battery-power consumption relative to leaving both the GNSS engine and the C-V2X modem on.

2. The method of claim 1, wherein determining whether the parked automotive vehicle is located at a hazard location further comprises: sending a location of the parked automotive vehicle to a map service.

3. The method of claim 2, wherein the map service is an Open-Source Routing Machine.

4. The method of claim 1, wherein, when the parked automotive vehicle is determined to be located other than at a known long-parking location, acquiring an expected parking duration.

5. The method of claim 4, wherein the expected parking duration is acquired via user input.

6. The method of claim 4, wherein the expected parking duration is determined based on a historical average-parking duration of the vehicle where the vehicle is parked.

7. The method of claim 4, wherein, when the acquired parking duration is not less than 20 minutes, turning off both the GNSS engine and the C-V2X modem to reduce battery-power consumption relative to leaving both the GNSS engine and the C-V2X modem on.

8. The method of claim 4, wherein, when the acquired parking duration is less than 20 minutes, putting both the C-V2X modem and the GNSS engine in standby mode to reduce battery-power consumption relative to leaving both the C-V2X modem and the GNSS engine on.

9. The method of claim 8, further comprising: setting and activating a timer, and, when the timer expires, turning off both the GNSS engine and the C-V2X modem to reduce battery-power consumption relative to leaving both the C-V2X modem and the GNSS engine in standby mode.

10. An automotive telematics control unit (TCU) comprising:

A TCU application processor that is coupled to a vehicle processor, a Global Navigation Satellite System (GNSS) engine, a plurality of cellular modems, and a Cellular Vehicle-to-Everything (C-V2X) modem, wherein the TCU application processor is configured to:
determine whether an ignition of the parked automotive vehicle is off;
determine whether the parked automotive vehicle is located at a hazard location;
when the parked automotive vehicle is determined to be located at a hazard location, leave both the C-V2X modem of the parked automotive vehicle and the GNSS engine of the parked automotive vehicle on to increase safety, relative to turning the C-V2X modem off, by having the C-V2X modem continue to send C-V2X messages;
when the parked automotive vehicle is determined to be located at a location that is not a hazard location, determine whether the parked automotive vehicle is located at a known long-parking location; and
when the vehicle is determined to be located at a known long-parking location, turn off both the GNSS engine and the C-V2X modem to reduce battery-power consumption relative to leaving both the GNSS engine and the C-V2X modem on.

11. The automotive TCU of claim 10, wherein determining whether the parked automotive vehicle is located at a hazard location further comprises: sending a location of the parked automotive vehicle to a map service.

12. The automotive TCU of claim 11, wherein the map service is an Open-Source Routing Machine.

13. The automotive TCU of claim 10, wherein, when the parked automotive vehicle is determined to be located other than at a known long-parking location, an expected parking duration is acquired.

14. The automotive TCU of claim 13, wherein the expected parking duration is acquired via user input.

15. The automotive TCU of claim 13, wherein the expected parking duration is determined based on a historical average-parking duration of the vehicle where the vehicle is parked.

16. The automotive TCU of claim 13, wherein, when the acquired parking duration is not less than 20 minutes, both the GNSS engine and the C-V2X modem are turned off to reduce battery-power consumption relative to leaving both the GNSS engine and the C-V2X modem on.

17. The automotive TCU of claim 13, wherein, when the acquired parking duration is less than 20 minutes, both the C-V2X modem and the GNSS engine are put in standby mode to reduce battery-power consumption relative to leaving both the C-V2X modem and the GNSS engine on.

18. The automotive TCU of claim 17, further comprising: a timer is set and activated, and, when the timer expires, both the GNSS engine and the C-V2X modem are turned off to reduce battery-power consumption relative to leaving both the C-V2X modem and the GNSS engine in standby mode.

* * * * *